United States Patent [19]

Geberth, Jr.

[11] Patent Number: 4,744,571
[45] Date of Patent: May 17, 1988

[54] SELF-COMPENSATING SEAL WITH BIASED SEALING WIPERS

[76] Inventor: John D. Geberth, Jr., 10 Goose Cove La., Ramsey, N.J. 07446

[21] Appl. No.: 883,404

[22] Filed: Jul. 8, 1986

[51] Int. Cl.$^4$ .............................................. F16J 15/24
[52] U.S. Cl. ...................................... 277/208; 277/165
[58] Field of Search ........... 277/207 R, 207 A, 207 B, 277/208-211, 165

[56] References Cited

U.S. PATENT DOCUMENTS

| Re. 24,440 | 3/1958 | Groen | 277/165 |
| 1,817,776 | 8/1931 | Sipe | 277/208 |
| 2,451,070 | 10/1948 | Chamberlain | 277/208 |
| 2,616,504 | 11/1952 | Osmun | 277/208 |
| 2,719,768 | 10/1955 | Webber | 277/208 |
| 2,935,365 | 5/1930 | Dega | 277/208 |
| 2,976,543 | 3/1961 | Turner et al. | 277/208 |
| 3,057,408 | 10/1962 | Griffitts | 277/208 |
| 3,183,009 | 5/1965 | Kunel | 277/208 |
| 3,194,571 | 7/1965 | Peickii et al. | 277/208 |
| 4,101,140 | 7/1978 | Reid | 277/208 |

FOREIGN PATENT DOCUMENTS

| 2440124 | 3/1975 | Fed. Rep. of Germany | 277/165 |
| 2446252 | 4/1975 | Fed. Rep. of Germany | 277/165 |
| 1184992 | 2/1959 | France | 277/165 |
| 1234830 | 5/1960 | France | 277/209 |
| 630024 | 10/1949 | United Kingdom | 277/165 |
| 2067713 | 7/1981 | United Kingdom | 277/165 |

Primary Examiner—Robert S. Ward
Attorney, Agent, or Firm—Collard, Roe & Galgano

[57] ABSTRACT

A self-compensating seal having a substantially toroidially shaped seal body and a plurality of axially separated annular wipers extending radially inwardly from the inner rim of the seal body in parallel arrangement. When a shaft or rod having a diameter greater than the inside diameter of the seal opening is inserted through the central seal opening, the wipers are bent or collapsed so as to extend in an axial direction. Each of the wipers is radially inwardly biased so that wear at the sealing surfaces of the wipers caused by shaft movement is compensated for automatically.

12 Claims, 2 Drawing Sheets

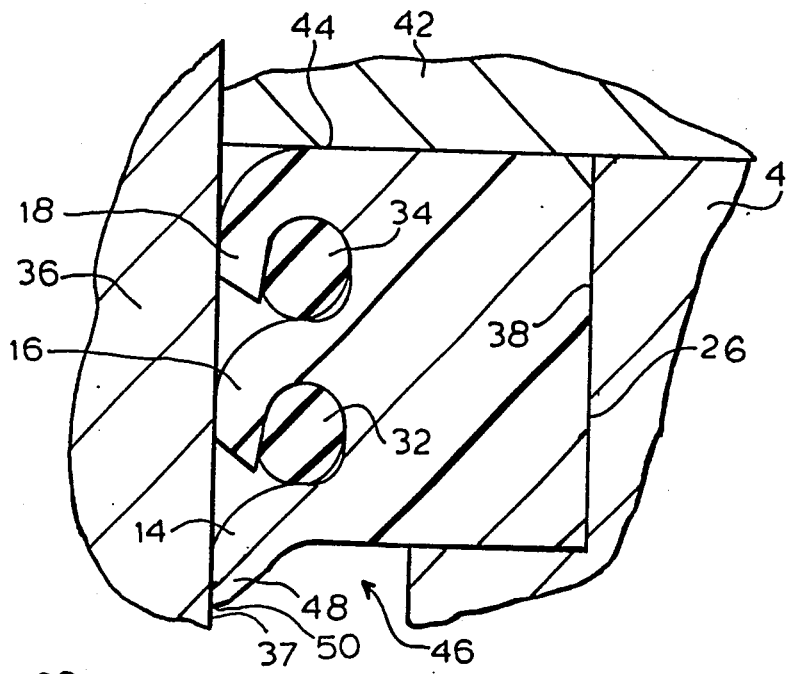
FIG. 5
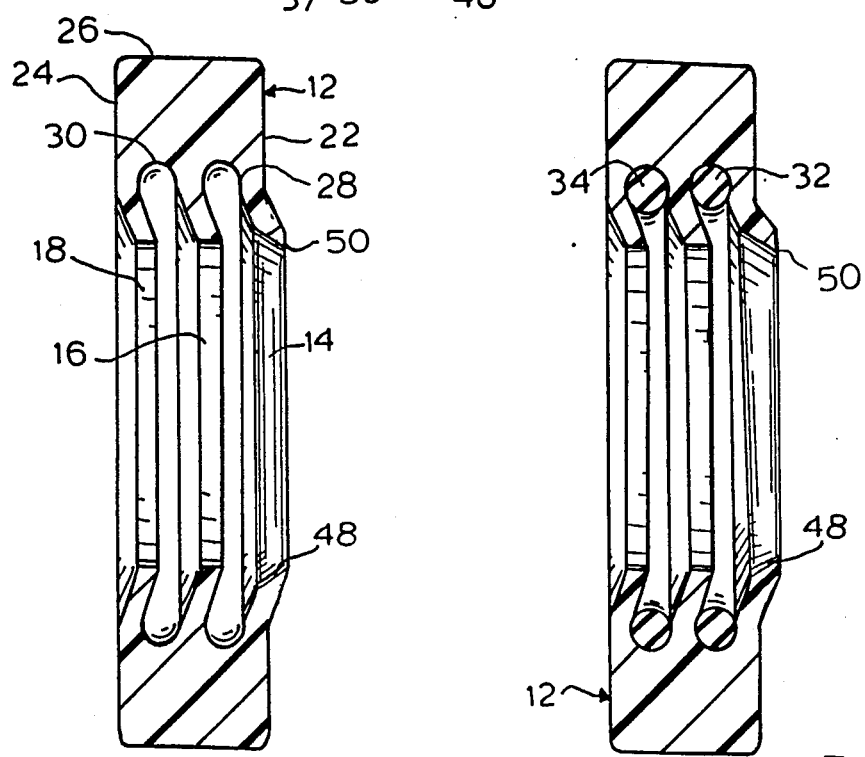
FIG. 3
FIG. 4

SELF-COMPENSATING SEAL WITH BIASED SEALING WIPERS

The present invention relates to a seal for use in machines and mechanical devices having rotating or longitudinally reciprocating shafts. More particularly, the present invention relates to a mechanical seal which is used for sealing rotating or longitudinally reciprocating shafts and which is self-compensating for wear at the sealing surface of the seal.

In many machines and mechanical devices having rotating or reciprocating shafts, mechanical seals or packings are required in order to prevent leakage past the rotating or reciprocating shafts. Such seals are often required internally in machines in order to prevent the mixing of two separated liquids and/or gases where the moving shaft communicates between both. Also, in the case where machinery has input and/or output shafts and a lubricant or other hydraulic material is utilized within the machine, a seal to prevent leakage of such material is required. As can be appreciated, the rotary or reciprocating movement of a shaft with respect to a seal or packing will cause the contacting surfaces of the seal or packing to wear. Eventually this wear becomes great enough that the seal no longer functions for its intended purpose and leakage past the seal occurs.

Seal wear is a particularly acute problem in pumps which are utilized for pumping relatively abrasive liquid materials under high pressure, such as hydraulic paint pumps. Such pumps are utilized in the painting industry for pumping paint to a very high pressure so that the paint may be hydraulically atomized by means of a spray gun and thus deposited on the surface to be painted. For sealing the operating shafts of such pumps, whether a seal is required internally or externally to prevent leakage past the piston or its shaft, the usual chevron-type packings are utilized. Such a packing consists of a serially arranged plurality of profiled washer-like elements formed of plastic which are compressed together longitudinally so that the internal diameter of the packing compresses against the pump shaft or piston. Such multi-packings are used for the purpose of giving the seal a long footprint along the shaft so as to ensure against fluid finding its way between the packing and the shaft.

In utilizing such chevron-type packings, extreme care must be exercised in the installation of the packing in the machine or pump with respect to the initial tightening thereof. Over tightening of the packing can result in excessive wear of the shaft and excessive consumption of power in moving the shaft. Insufficient tightening can result in leakage past the seal and eventual destruction of the seal. In the case where such packings are used externally, it is often possible to adjust or compensate for the resulting wear manually by tightening the gland nut which further compresses the internal diameter of the packing against the shaft. Obviously, such an adjustment of a packing or seal cannot be effected in the case where the seal is located internally within the pump or machine. In the latter case, it is necessary to completely dismantle the machine and rebuild the same with new packings and seals. As a leak initially occurs with such packings, particles of material pass the first of the series of plastic washers and, because of the fluid pressure in the case of a pump, these particles are eventually pushed past all of the sealing washers resulting in destruction of the seal. Another problem that the use of such packings internally can lead to is that when the seal leaks, which may not be realized because of its internal location, damage to the pump rod or piston may result before the problem becomes evident.

Seals, and particularly packings as described above, are formed of plastic material such as Teflon or polyethylene and are formed with an internal diameter equal to the diameter of the shaft with which they are used. Teflon is a material which tends to cold flow or set so that in the case of packings made therefrom, the grip on the shaft or piston is eventually relaxed with time, thus allowing leakage past the seal. In the case of a paint pump as described above where the paint is abrasive, this leakage can very quickly destroy the seal.

It is, therefore, a primary object of the present invention to provide an improved mechanical seal for use with rotating or reciprocating shafts or pistons of machines wherein the sealing properties of the seal are not diminished due to wear at the sealing surface thereof.

This object, as well as others which will hereinafter become apparent, is accomplished in accordance with the present invention by the provision of a seal for sealing between a reciprocating or rotating shaft and guide therefor, the seal being in the form of a substantially unitary structure having a substantially toroidally shaped seal body and a plurality of annular wipers extending radially inwardly from the seal body in parallel arrangement and which are spatially separated in the axial direction. The annular wipers are given an initial slant or bend in an axial direction and the shaft to be sealed, which has a diameter greater than the inside diameter of the seal, is inserted through the annular opening of the seal in this same axial direction causing the wipers to bend or collapse further in the same axial direction. Biasing means are associated with each wiper which cause the wiper to be pushed against the moving shaft and, as wear occurs at the wiper surfaces in contact with the moving shaft, the wiper is pushed by the bias acting thereon against the shaft so that this wear is compensated for automatically.

According to another embodiment of the present invention, the annular wipers extend radially outwardly from the toroidally shaped seal body rather than inwardly. Such a seal can be utilized as a ring seal as on a reciprocating piston and functions essentially in the same way as the mechanical seal described above.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 3 is a diametric cross-sectional view of the seal of FIG. 1 with the biasing elements thereof removed;

FIG. 4 is a diametric cross-section of the seal similar to FIG. 3 showing the biasing elements in place;

FIG. 5 is a diametric cross-sectional view of a portion of a seal according to the present invention shown in cooperation with a moving shaft.

Figure 1:
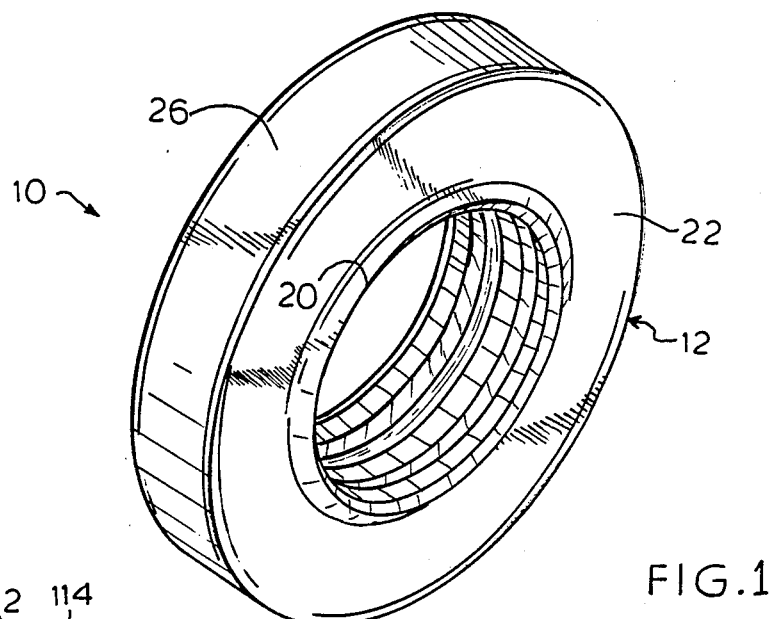
FIG. 1 is a perspective view of the self-compensating seal according to the present invention.

Now turning to the drawings, there is shown in FIGS. 1 to 4 a self-compensating seal according to the present invention, generally designated 10, which is formed of a plastic material, preferably a high molecular weight polyethylene. Seal 10 is basically comprised of a substantially toroidally shaped outer seal body 12 whose inner rim or hub is provided with a plurality of substantially radially, inwardly directed annular wipers, designated 14, 16 and 18, which are substantially parallel with one another and which define a central seal opening 20. Toroidally shaped outer seal body 12 has substantially parallel side faces 22 and 24 and an annular outer surface 26. Side faces 22 and 24 terminate radially inwardly at the inner rim of seal body 12.

Although any number of inwardly directed annular wipers may be provided, at least two such wipers are required in order for the seal to function and it has been found that three are preferred. As clearly seen in FIG. 3, each of the annular wipers 14, 16 and 18 is spatially separated from one another in the longitudinal or axial direction so that annular grooves 28 and 30 are defined between pairs of annular wipers 14, 16 and 16, 18, respectively. As clearly seen in FIGS. 2 and 4, O-rings formed of resilient material such as rubber and designated 32 and 34 are received in annular grooves 28 and 30, respectively. Annular wipers 14, 16 and 18 are initially bent or slanted in an axial direction so that the O-rings are thus, in effect, enclosed and restrained within the respective grooves because of the partial overlapping thereof by the slanted or bent annular wipers.

As clearly seen in FIG. 5, when seal 10 is used in conjunction with a reciprocating or rotating shaft, designated 36, the seal is positioned in annular groove 38 in the apparatus housing or guide 40 with shaft 36 passing through the central opening 20 of the seal. The purpose of seal 10 is to prevent leakage between guide 40 and shaft 36. Shaft 36 has a diameter greater than the diameter of central opening 20 of seal 10, so that wipers 14, 16 and 18 are further bent or collapsed radially and a presqueeze, resulting from the memory of the polyethylene material used, is thereby put on the shaft at the surface 37 thereof to be sealed so as to initially prevent fluid leakage. Preferably, the larger diameter of shaft 36 causes a 10% to 20% increase in the diameter of central opening 20 of seal 10 from the relaxed state thereof. Seal 10 is so arranged on shaft 36 that the axial direction of the slant of wipers 14, 16 and 18 is in the direction of the high pressure side of shaft 36. Seal 10 is tightened by tightening means 42, such as a gland nut or similar device, which clamps against side faces 22 and 24 of seal body 12 to establish static seals at side faces 22 and 24. This design eliminates operator error in installing the seal since an accurate tightening of the seal is unnecessary. The operator simply fully tightens tightening means 42 thereby clamping seal body 12. A back up, designated 44, is provided for annular wipers 14, 16 and 18 on the low pressure side of seal 10 and may be formed as part of tightening means 42. Back up 44 fits with a close tolerance annularly around shaft 36 and prevents the wipers from inverting their axial slant.

Assuming that seal 10 of FIG. 5 is utilized in a pump for pumping fluid under high pressure, then the space 46 on the lower side of seal 10 contains the high pressure fluid. In the case where seal 10 is used in such a pressurized environment, particularly where the fluid contains abrasive particles as in the case of paint, it is preferable to provide a bevel at the outer edge of the annular wiper exposed to the high pressure fluid, wiper 14 in FIG. 5, at 48, as clearly seen in FIGS. 3 and 4. Thus, in the installed condition the radially inwardly directed edge, designated 50, created by bevel 48 serves as a knife-like scraper or plow and deflects the abrasive particles of the fluid so that they do not become wedged between shaft 36 and seal 10 which would result in scoring of the shaft and destruction of the fluid seal. Also, this construction allows the high pressure fluid to exert pressure against wiper 14 towards surface 37 so that as the sealing surface of annular wiper 14 wears, the pressure exerted thereon by the high pressure fluid maintains wiper 14 in effective sealing contact with shaft 36. If after a prolonged period of operation of the machine, some pressurized material gets by the first wiper 14 and enters into the space or cavity between wipers 14 and 16, the pressure exerted by this material acts upon annular wiper 16 to further increase the pressure exerted by wiper 16 on shaft 36.

When seal 10 is installed as in FIG. 5, the wipers are further bent or partially collapsed, due to the larger diameter of shaft 36, so that wipers 16 and 18 are wrapped around resilient O-rings 32 and 34 to compress the resilient material of the O-rings and effect a radially inwardly directed bias on annular wipers 16 and 18. This biasing action on wipers 16 and 18 increases the sealing pressure exerted by the wipers on shaft 36 and, as the sealing surfaces of the wipers become worn, the biasing action of the O-rings, together with the presqueeze resulting from the memory of the polyethylene material, continues to force the sealing surfaces of the wipers against shaft 36 so as to compensate for this wear. Thus, the self compensation feature of seal 10 is derived from the memory of the polyethylene material together with the biasing action of the resilient O-rings.

Figure 6:
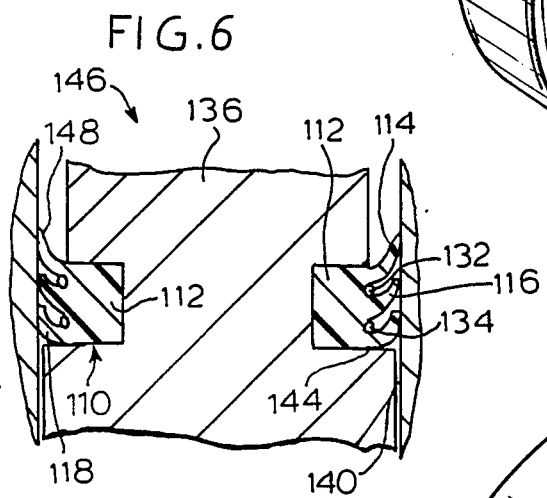
FIG. 6 is a diametric cross-sectional view of another embodiment of a self-compensating seal according to the present invention in cooperation with a piston and cylinder.
Figure 2:
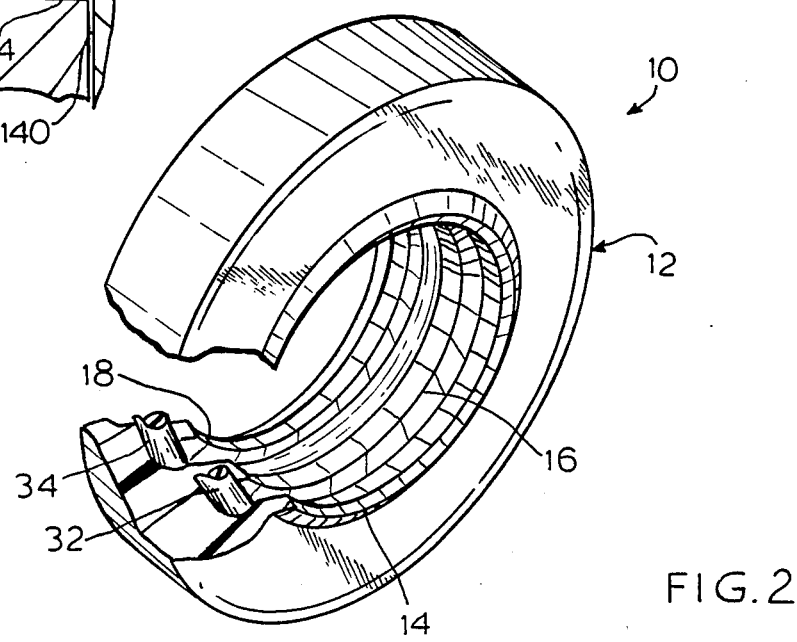
FIG. 2 is a perspective view of the seal of FIG. 1 having a portion thereof broken away.

In FIG. 6, another embodiment of the seal of FIGS. 1 to 5 is shown wherein the seal, designated 110, is in the form of a ring seal utilized as a seal on a reciprocating piston 136 which is adapted to reciprocate within cylinder wall 140. As can be seen, annular wipers 114, 116 and 118, rather than being inwardly directed from seal body 112, are outwardly directed toward cylinder wall 140. Seal 110 is so positioned that wipers 114, 116 and 118 are directed, because of their inclination as well as their collapsed situation, toward the area of high compression 146 of piston 136. Seal 110 operates substantially in an identical manner to that described in connection with seal 10 of FIGS. 1 to 5, so that the inside diameter of the cylinder is less than the outside diameter of seal 110 so that wipers 114, 116 and 118 are further collapsed from their relaxed state and O-rings 132 and 134 bias the collapsed wipers 116 and 118 outwardly. Thus, the wear at the sealing surfaces of the wipers is compensated for. The high pressure of the material being pumped by piston 136 acts on bevel 148 of annular wiper 114 to increase the pressure of the wiper against cylinder wall 140 in a manner identical to the operation of the pressure in space 46 on wiper 14 of seal 10 as described in connection with FIG. 5. A back-up 144 is also provided to prevent inversion of wipers 114, 116 and 118.

While only two embodiments of the present invention have been shown and described, it will be obvious that many changes and modifications may be made thereto without departing from the spirit and scope of the present invention.

What is claimed is:

1. A self-compensating seal installed to effect a fluid tight seal between a recirpocating or rotating shaft and a guide therefor by sealing against a surface to be sealed, said seal comprising:
   (a) a toroidally shaped seal body;
   (b) at least two substantially parallel annular wipers extending radially from said toroidally shaped seal body, said annular wipers being spatially separated from one another in the axial direction so as to define grooves between pairs of said annular wipers, said parallel annular wipers being partially collapsed to extend in the axial direction of higher fluid pressure when said seal is in the installed condition, the annual wiper adjacent the high fluid pressure being beveled so that in the partial collapsed state of said wipers when said seal is in the installed condition, the pressure exerted on said beveled annular wiper by the high fluid pressure is radially directed to force said annular wiper against the surface to be sealed and said wiper forms a knife-like scraper edge with said surface to be sealed; and
   (c) biasing means disposed in each groove defined between said pairs of annular wipers biasing said partially collapsed annular wipers against said surface to be sealed.

2. The self-compensating seal as defined in claim 1, wherein said biasing means includes an O-ring formed of resilient material disposed in each said groove between pairs of annular wipers, when said annular wipers are partially collapsed in the installed condition of the seal, the annular wipers associated with O-rings wrap around the associated O-ring to compress the resilient material thereof so that a radial bias is effected thereby on said associated annular wipers.

3. The self-compensating seal as defined in claim 1, wherein said shaft guide is provided with an internal annular groove in which said seal body is axially clamped, and said annular wipers extend substantially radially inwardly from said seal body.

4. The self-compensating seal as defined in claim 1, wherein said shaft is provided with an annular groove in which said seal body is axially clamped, and said annular wipers extend substantially radially outwardly from said seal body.

5. The self-compensating seal as defined in claim 4, wherein said shaft is a piston and said guide is a cylinder.

6. The self-compensating seal as defined in claim 1, wherein said substantially parallel annular wipers, when the seal is not installed, are initially inclined in the same axial direction that the axial wipers extend when the seal is in the installed position and said wipers are partially collapsed against the surface to be sealed.

7. The self-compensating seal as defined in claim 1, wherein said seal body and said plurality of annular wipers are formed of plastic material which has a memory.

8. The self-compensating seal as defined in claim 1, wherein three annular wipers extend from said seal body.

9. The self-compensating seal as defined in claim 1, wherein said seal body and said plurality of annular wipers are formed of high molecular weight polyethylene.

10. The self-compensating seal as defined in claim 1, wherein said annular wipers are partially collapsed upon installation so that the inside diameter of said seal is 10% to 20% greater than in the relaxed state.

11. The self-compensating seal as defined in claim 1, wherein said wipers extend radially inwardly from said seal body.

12. The self-compensating seal as defined in claim 11, wherein said shaft guide is provided with an internal annular groove in which said seal body is axially clamped.

* * * * *